May 23, 1933.　　　I. D. WALTER　　　1,910,726
ADVERTISING DISPLAY APPARATUS
Filed March 5, 1930　　　3 Sheets-Sheet 1
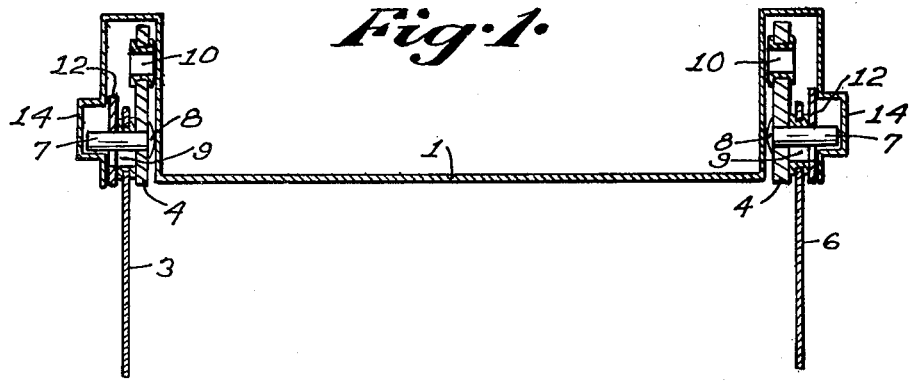
Fig. 1.
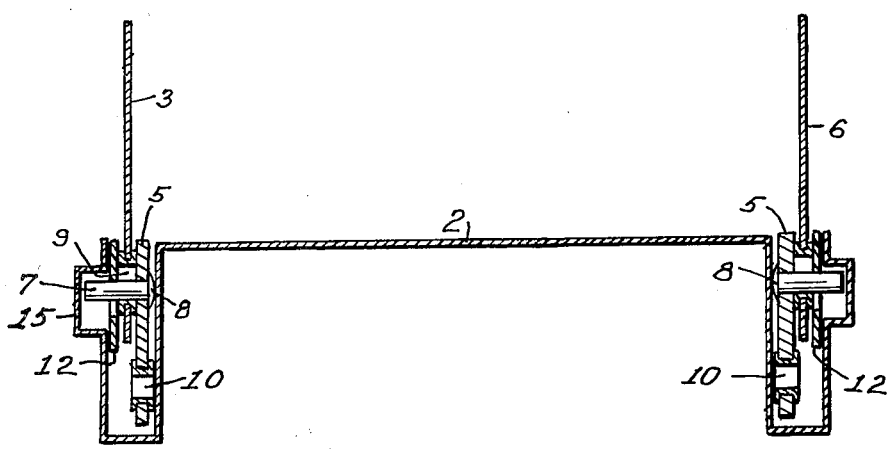
Fig. 2.
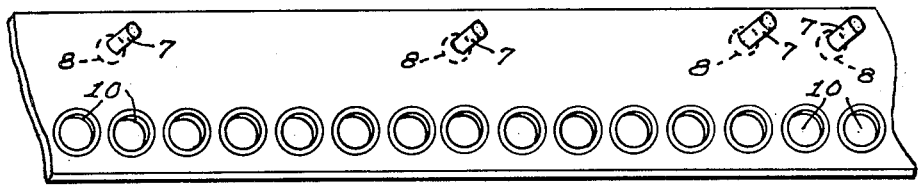
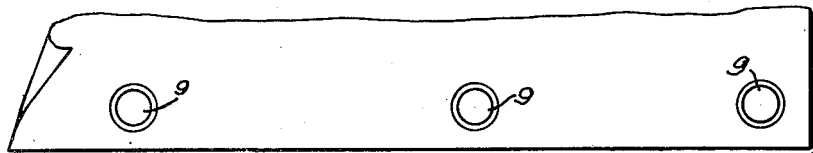
Fig. 3.
Fig. 4.
INVENTOR:
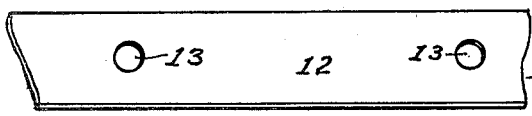

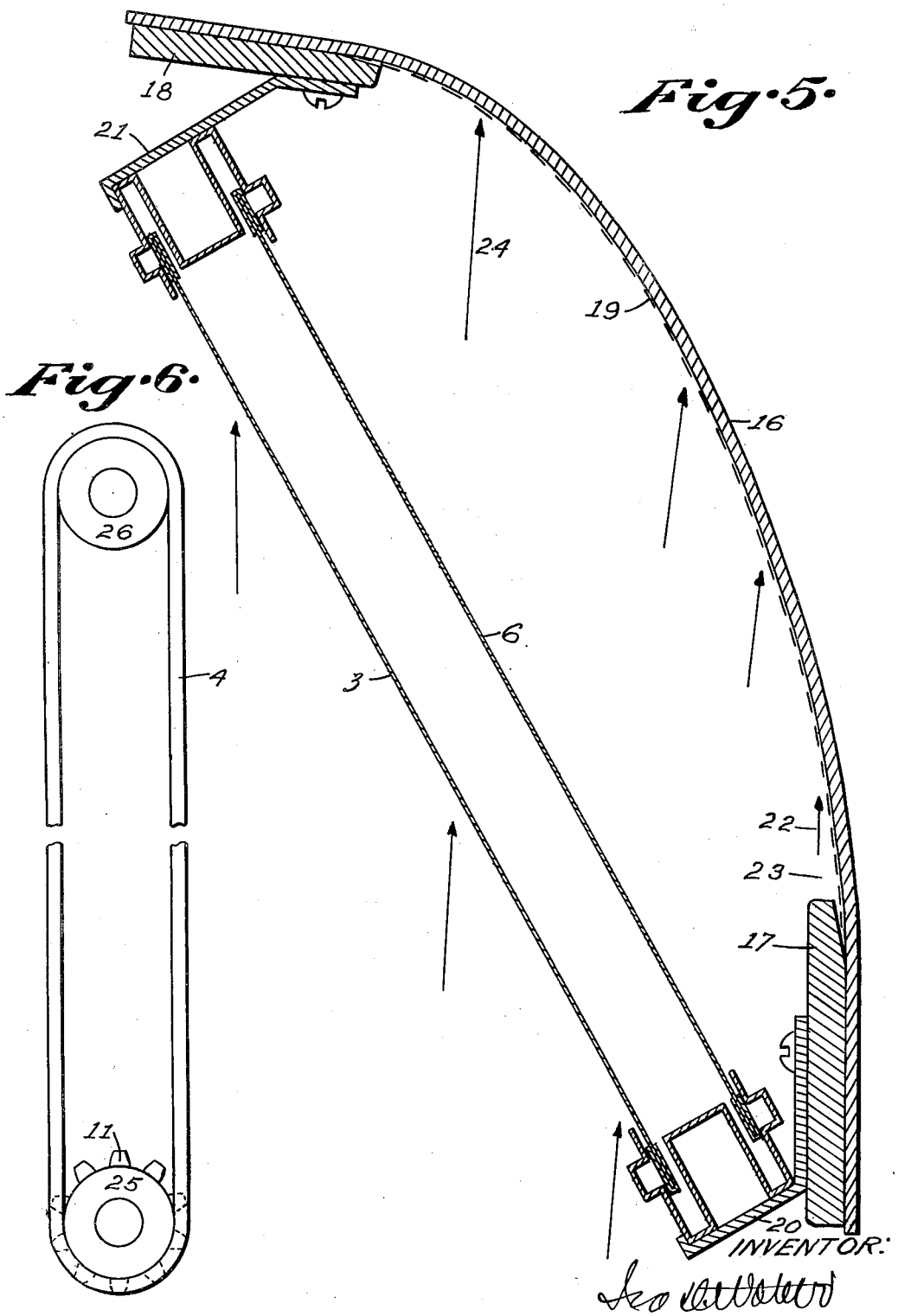

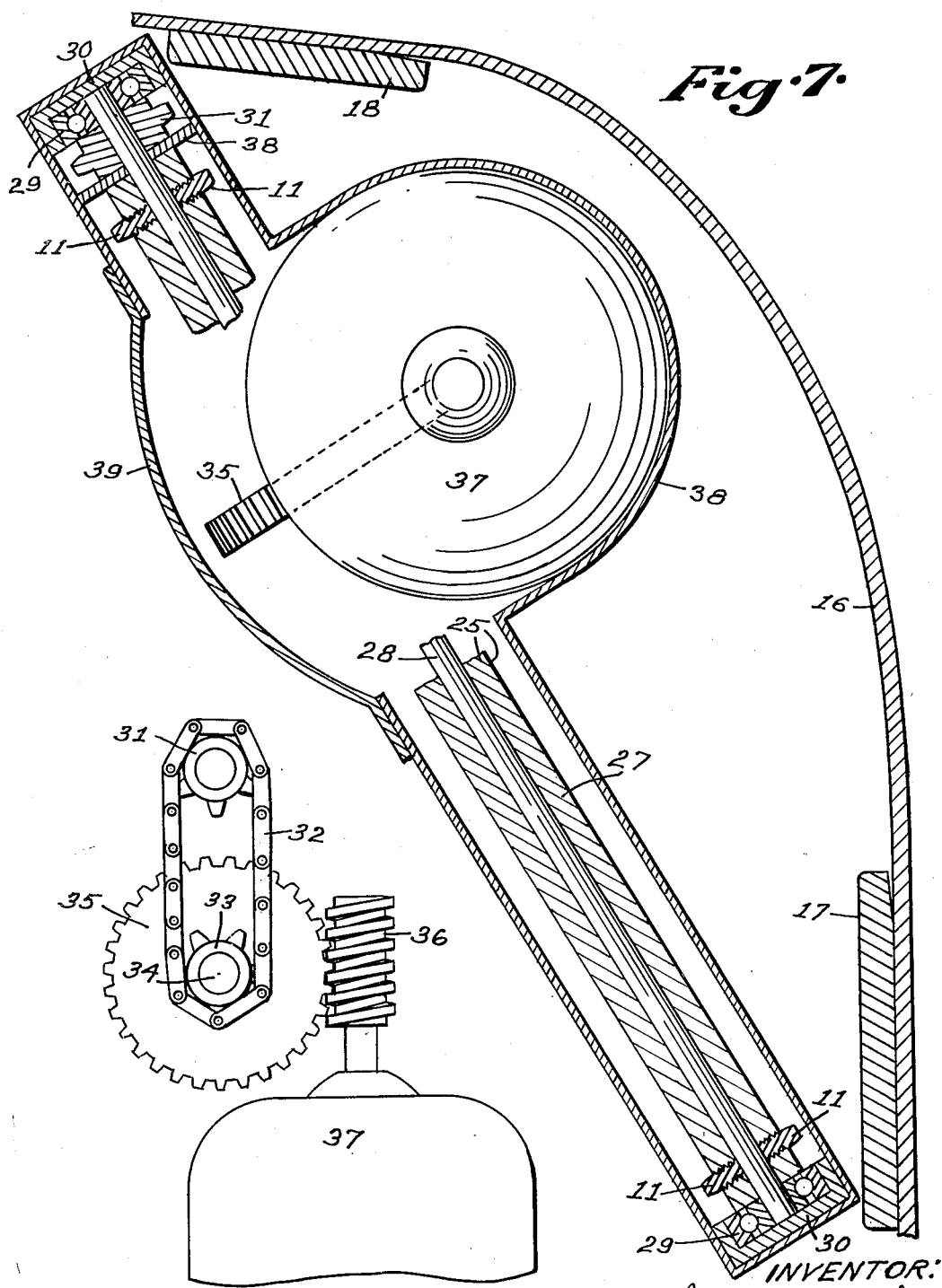

Patented May 23, 1933

1,910,726

UNITED STATES PATENT OFFICE

IRA D. WALTER, OF CLAYTON, MISSOURI

ADVERTISING DISPLAY APPARATUS

Application filed March 5, 1930. Serial No. 433,463.

My invention relates to that class of advertising service adapted for display in street cars and buses and also indoor places such as drug stores, confectioneries, restaurants, barber shops and other public places where people gather or frequent in numbers.

It is also adapted as a means for displaying outdoor advertising in such manner as will utilize small available space on the walls of buildings or vacant space suitable for concentrating the attention of large numbers of persons similar to that of conventional outdoor advertising.

The invention has for its especial object the doubling of capacity for displaying a given amount of advertising matter within a fixed space. A further desirable purpose is that of increasing the effectiveness or results likely to be obtained from the use of a particular advertisement by rendering more attractive and pleasing to the eye the manner in which the said advertisement is presented, and also by enlarging the facilities for displaying said advertisement within the scope of vision of a greater number of persons than is possible with present methods.

Under modern economic conditions, with advertising recognized as an essential factor in the successful conduct of nearly every kind of business, a particular form of advertising that has attained great volume is that of indoor display by means of attractively printed cards. An important branch of this type is that of street car and bus advertising. Another is that of display cards for use in drug stores and show windows of dealers in the particular line featured.

With this in view I have devised a system for displaying the advertising matter of clients in such manner as will assure more profitable results by attracting the attention of a greater number of persons who are brought within the visible range of said display device than is possible with any conventional method now in use. It is well known that a moving object having a fixed or well defined background has a greater appeal or attraction to the eye than has the same object if stationary. In accordance with this principle I have constructed a device for displaying advertising matter printed or painted on sheets of standard and uniform size that will continuously rotate or move said sheets through a recurring cycle of revolution. Thus to the person whose gaze is attracted to the moving card or lithograph, an interest is sought to be created by the moving panorama that will hold the attention and thus produce the desired mental impressions which it is the purpose of advertising to produce.

In accordance with the foregoing general statement of advantages contained in my system, the means for carrying out the desired ends consists of a motor or power-propelled mechanism comprising two endless belts spaced apart and traveling preferably horizontally through a guide-housing, at either end of which is a roller, around which the belts travel. One of the rollers is connected by a drive mechanism to the motor, geared down so as to revolve at the desired low rate. For the purpose of providing a positive drive for each belt and also in order to synchronize the movement of one belt with the other, each belt is provided with spaced perforations along one edge, these perforations cooperating with projecting teeth in the driving roller, similar in action to a link belt on a sprocket wheel. At spaced intervals on each belt are short metal pegs extending therethrough on which are hung the advertising sheets by means of perforations at top and bottom corresponding in number and position with the fastening elements in the conveyor belts. The belts with the sheets attached as described, pass through a guide-housing in the form of sheet metal formed so as to permit the free movement of the belts within fixed limits so as to maintain the sheets in the desired full spread during their continuous and recurring cycle of rotation.

The apparatus thus operating assumes the form of an elongated panel fixture, in external appearance defined by an attractive sheet metal frame, top and bottom, which serves as the guide-housing, the belt-rollers at either end, together with the motor and driving mechanism similarly housed from view, and the entire space within this setting comprising a moving panel of artistically colored and constantly changing advertising matter, such as will be suitable for placing over standard wall cases in stores and for mounting in vacant wall space in shops, restaurants and other public places.

Describing the apparatus more in detail, reference is had to the accompanying drawings, in which Fig. 1 represents a cross-section of one of the display fixtures just described with the advertising sheets in partial section. Fig. 2 is a longitudinal section of one of the belts. Fig. 3 is a section from one of the sheets at the bottom right-hand corner. Fig. 4 is a section from the retaining tape used in connection with the attachment of sheets to the belts. Fig. 5 is a cross-section of a portion described as upper quarter roof section of a typical type of street car, together with a cross-section of display device attached thereto, and indicating the panel as at present used for displaying of advertising cards. Fig. 6 is a top plan view of one of the belts in partial section together with its propelling roller and tension roller. Fig. 7 is a cross-section through the drive roller with its attachments and housing, and showing in outline the motor and part of its driving gear. Fig. 8 is a partial top plan view of the motor with its gearing and that of the driving roller.

Referring to Fig. 1 we have a full cross-sectional detail of the top and bottom housing forming the type of display fixture adapted for stores, shops, etc., together with the belts and associated parts for propelling the attached advertising sheets in their recurring cycles of rotation lengthwise of the panel, around and back. The top section of guide-housing is designated 1, and the bottom section 2. In partial section 3, 3, is shown a sheet suspended on the belts 4 and 5, and 6, 6 indicates in partial section another and separate sheet suspended on the same belts, 4 and 5, but on the opposite side of the display fixture. Inasmuch as the two sections 1 and 2 constitute the top and bottom framework of a rigid fixture for carrying the advertising sheets, it is necessary that means be provided for spacing the two sections apart. This may take the form of suitable brackets or light metal braces at intervals attached to the sections within the space enclosed by the attached sheets, so that the advertising sheets may be visible in the panels on both sides of the fixture. The particular form of these bracing element is so immaterial that any illustration thereof is omitted.

The belts 4 and 5 are of a standard type of construction, preferably that of cotton fabric impregnated with rubber to provide flexibility and a minimum of stretching under usage, and after being threaded through the guide-housing and around the roller at either end, the ends of the belts are joined preferably by means of standard metal fasteners best suited for the purpose. Metal pegs 7 having the heads 8 are shown protruding through the belt with the heads bearing against the inside of guide-housing, which serves to prevent detachment of said pegs from their position in the belt. 9 indicates eyelets in spaced perforations in the margins top and bottom of sheets suspended as shown in Fig. 1. These eyelets are of the conventional metal type used for numerous purposes to prevent tearing and wear of the perforations, and may be contained in the body of the sheet or that of a folded strip of paper or other substance which is pasted or otherwise suitably attached to the sheet. These eyelets in the detached portion of sheet Fig. 3 are longitudinally in the same relative position as the pegs or hangers 7 of Fig. 2, so that the eyelets will pass freely over the pegs in attaching the sheets to belts. The two pegs in right hand portion of belt section, Fig. 2 are shown in closer proximity to each other than are the others, which are spaced equi-distantly apart. This provides for the attachment of the adjoining ends of two separate sheets, as indicated by the eyelet in right hand corner of detached portion of sheet, Fig. 3. To cover the joint formed by the two abutting sheets mentioned, a narrow strip of uniformly colored paper may be attached to the margin of one sheet so as to overlap the joint and thus provide a uniform division or margin between the advertising sheets. Perforations 10 reinforced with metal eyelets are shown in belt section Fig. 2 and in cross section, Fig. 1. These perforations or apertures engage teeth on the driving roller and serve to propel the belt forward by an action similar to that of a chain belt on a sprocket wheel. In certain types of apparatus these apertures may be situated relatively farther apart than those shown in Fig. 2, and by reason of the gripping action of the tightly tensioned rollers tending to propel the belts by means of friction alone, the reinforcement of the metal eyelets may in such cases be dispensed with, the perforated walls of belt being sufficiently durable to withstand the forces imposed upon it, the apertures cooperating with the teeth 11 of roller, Figs. 6 and 7, serving mainly to synchronize the movements of the two belts so as to prevent the attached sheets from becoming distorted. To prevent friction and wear upon the paper sheets by coming in moving contact with the metal of guide-housing, the tape belt, of which a detached section is shown, Fig. 4, having the perforations, 13, is interposed upon the pegs 7 and between said sheets and the housing as clearly indicated in Fig. 1. As stated, this tape 12 is in the form of a belt conforming in every respect as to circumferential length and movement with that of the belts 4 and 5 of Fig. 1. By reference to Fig. 1 it will be seen that the projecting portion 14 of housing 1 is identical in cross section with the portion 15 of housing 2. The purpose of these projecting portions is to form a guide-way and support for the upper belt 4 intermediate of its two extremities through the action of the pegs 7 which are in contact therewith throughout their cycle of rotation. The desired vertical tension in maintaining the advertising sheets at smooth spread is obtained by so spacing the marginal perforations top and bottom that the belt 5 will be suspended thereon by reason of the pegs 7 extending through said apertures. For purposes of description the top and bottom belts and housing sections are differently designated, but in construction are identical, excepting their relative position which is inverted.

Referring to Fig. 5 I show a type of fixture adapted for displaying advertising in street cars and busses. The details of the device in this case are the same as those shown in Fig. 1, but for clarity of illustration I omit most of these details and show only such parts as are essential to the purpose of the particular figure. In Fig. 5 I have depicted a typical roof plan representing the upper right-hand quarter in cross-section 16. Extending lengthwise the car 17 and 18 are strips of moulding, the space intervening as indicated by dotted line forming an elongated panel in which is displayed a continuous row of advertising cards from one end of car to the other and on both sides of the car. The cards, represented by the dotted line 19, have their top and bottom margins fitted into the space 20 at edge of each moulding, and conform to the inwardly curved roof section as indicated. Mounted on the brackets 20 and 21 is shown my display apparatus in operative position with the advertising sheets in full vertically inclined section.

By reference to the arrows of Fig. 5, a diagrammatic illustration is presented therewith defining the relative visibility of printed matter on sheets displayed by both methods referred to as relating to a person seated directly beneath and next the wall of car. The arrows are arranged in the line of sight of the person designated and their length indicates the relative degree of visibility afforded by the varying degrees of inclination in the display sheets thus mounted. The arrow 22, indicating the point of least visibility, shows a space 23 extending to the bottom margin of card that is entirely obscured from view by the moulding 17. The increasing degree of angle in the roof section as it extends upward affords better visibility as indicated by greater length of arrows, the maximum degree being attained near the top, as indicated by arrow 24. A comparison therewith clearly discloses the better visibility afforded by the device of my invention, in which the entire printed surface of the sheets is presented in the line of sight.

In street car advertising the effective results possible to obtain from a particular advertisement are limited to the number of persons who come within the range of its clear visibility. In the conventional method of advertising display, occupying a fixed space on the wall of car, it is clear that a large percentage of persons riding in the car are outside this effective range of visibility. By utilizing the moving features of my display system, each advertisement is alternately passing in view of practically every person in the car. In street car advertising a standard form and size of card is used in all cars throughout the land. This renders it desirable in changing from the present form of fixed display to that of my moving panel to be able to use sheets of the same size, except as to thickness of stock, in which case the sheets are of much lighter texture to provide the necessary flexibility for passing the belt rollers of the display mechanism. The cross section of the display fixture of Fig. 5 shows the advertising sheets 3 and 6 in full section from top to bottom and of the same relative width or depth as the fixed sheet indicated by dotted line 19, which they are proposed to displace.

In the top plan view of Fig. 6 is depicted the arrangement of the two rollers 25 and 26, which form the two extremities of belt assembly. The belt 4, in partial section, is shown in contact with the driving teeth 11 of roller 25 and in friction contact with roller 26. The arrangement and operation of belt 5, on opposite ends of rollers 25 and 26 is identical with that of belt 4. Proper tensioning of belts may be provided at all times by suitable mechanism attached to the bearings of roller 26, which are identical with the bearings 29, Fig. 7.

In Fig. 7 a cross-sectional detail is shown of the propelling roller 25 and its associated parts. The roller, shown in partial section, may consist of the body 27, of wood or other suitable composition, and having the core 28 extending axially of same and forming a bearing at either end for cooperation of the ball bearings 29 in the ball races 30. Embedded in the body 27 of roller 25 adjacent either end are the driving members 11 which cooperate with the apertures 10 of belts. It is obvious that driving members may be substituted for those of 11 as shown, consisting of small toothed gears, if desired, 31 represents a sprocket gear on the upper portion of roller 25 for cooperation with the driving chain 32, which in turn is driven by the sprocket 33 of motor gearing, Fig. 8. As disclosed in the top plan view of Fig. 8, the sprocket 33 is mounted on the upper portion of a shaft 34 extending through the worm gear 35, which is driven by the worm 36 of motor 37. Between the gear 31 and the roller 25 is interposed the spacer 38, which serves to prevent any possibility of oil from the gearing reaching the portion of roller carrying the belts and advertising sheets.

Various means may be employed for transmitting power to the display device of my invention, but sufficient for the purpose is the power unit as outlined. In Fig. 7 I show a rear-end view of the motor 37 set in the housing 38 in position for operation, with a partial view of the worm gear 35 in dotted lines and section. Access to said motor may be had by means of the detachable section of housing 39. The manner of attaching the motor to the housing and the details of mounting the various gears that comprise the power unit are so obvious that for clarity of illustration of the essential elements they are omitted.

A similar power unit to the one herein described may be used to propel the display device illustrated in Fig. 1. In this portable type of fixture, having a relatively wider space between the two exposed faces, the power unit may be contained inside, access thereto being provided through the top of fixture.

From the foregoing description the operation of my display apparatus may be clearly understood except as to the manner of attaching and detaching the advertising sheets. This is accomplished by having a section of the outer guide-housing made detachable from the main body thereof, preferably adjacent one of the propelling rollers. This gives access to the driving belts top and bottom. The outer tape may thus be slipped from its position on peg hangers and the sheet hung thereon or removed as the case may be. After one sheet has been handled in the manner described, pulling of one of the belts will rotate the assembly into position for removing or replacing any sheet desired, or all of them, when occasion necessitates such change. It will be understood that the changing of advertising sheets is only attempted with the motor idle and current switched off.

Various changes may be made in the construction and arrangement of the various parts entering into the structure herein disclosed within the spirit and scope of my invention and I do not intend to limit myself to the particular embodiments only as presented herewith.

What I claim is:

1. A device for displaying advertising matter comprising endless belts, a guide-housing within which said belts travel in recurring cycles of rotation, said belts and guide-housing being disposed in two parallel sections forming opposite sides of a panel-like fixture, a driving member and a tensioning member at opposite ends of said fixture, means for effecting the spaced relation of said belts and the attachment thereto of advertising sheets comprising pins extending through said belts, and a grooved portion extending lengthwise said housing members for cooperation with said pins.

2. A device for displaying advertising matter comprising endless belts, a guide-housing within which said belts travel in recurring cycles of rotation, said belts and guide-housing being disposed in two parallel sections forming opposite sides of a panel-like fixture, a driving member at one end and a tensioning member at opposite end of fixture, means for maintaining the spaced relation of the belts comprising pins extending therethrough and grooves extending lengthwise of said guide-housing for cooperation with the projecting ends of pins, perforated advertising sheets suspended upon said pins, and a projecting lip on said guide-housing for covering the margins and preventing detachment of said sheets from said fixture.

3. A device for displaying advertising matter comprising endless belts, a guide-housing within which said belts travel in recurring cycles of rotation, a tensioning member at one end of said guide-housing and a driving member at opposite end, means for securing the synchronized movement of the said belts including toothed projections on said driving member engaging spaced apertures in said belts adjacent the outer margins of each, means for maintaining the spaced relation of said belts comprising pins extending therethrough and grooves extending lengthwise of said guide-housing for cooperation with the projecting ends of pins, perforated advertising sheets suspended upon said pins, a tape-like endless belt perforated and interposed upon said pins between said sheets and the overlapping portion of a guide-housing.

4. A device for displaying advertising matter comprising endless belts, a guide-housing forming the two parallel sides of a panel fixture, a driving member at one end of the fixture and a tensioning member at the opposite end around which the belts rotate within said housing, toothed projections on said driving member and spaced apertures in said belts adjacent their edges farthest apart for cooperation therewith in driving the belts, means for attaching sheets to said belts including metal pins extending through the belts for cooperation with perforations in the margins of said sheets and means in said belts and housing for maintaining the said sheets fully extended during their rotative movement through the panel of said fixture.

5. A device for displaying advertising matter comprising endless belts, guide-housing forming the two parallel sides of a panel fixture, a driving member at one end of the fixture and a tensioning member at the opposite end around which the belts rotate within said housing, toothed projections on said driving member and spaced apertures in said belts adjacent their edges farthest apart for cooperation therewith in driving the belts, means for attaching sheets to said belts including metal pins extending through the belts adjacent their edges nearest together for cooperation with perforations in the margins of said sheets, and means for maintaining said belts in spaced parallel relation to each other comprising grooved channels in said housing through which the extended portions of said belt pins pass with the rotation of said belts.

6. A device for displaying advertising matter comprising endless belts, a guide-housing forming the two parallel sides of a panel fixture, a driving member at one end of the fixture and a tensioning member at the opposite end around which the belts rotate in said housing, means on said driving member for cooperation with the belts in effecting their cycles of revolution, means for attaching sheets to said belts including fastening elements attached thereto adjacent their edges nearest together for cooperation with said advertising sheets, and means in the said housing and said belts for maintaining the spaced relation of said belts to preserve the full spread of said sheets during their recurring cycles of revolution.

7. A device for displaying advertising matter comprising endless belts, a guide-housing forming the two parallel sides of a panel fixture, a driving member at one end and a tensioning member at the opposite end of the fixture around which the belts travel in said housing, toothed projections on said driving member for cooperation with apertures in said belts adjacent their edges farthest apart, means for attaching advertising sheets to said belts comprising metal extensions attached to said belts adjacent their edges nearest together and passing through apertures in the margins of said sheets, a tape belt attached to said extensions as a buffer to protect the paper sheets from contact with the housing, and means in said housing for preserving the spaced alignment of said belts and sheets comprising an offset shoulder for cooperation with said belt extensions.

8. In combination, a device for displaying advertising matter comprising endless belts, housing sections forming the opposite sides of a panel fixture within which said belts travel, a tensioning member at one extremity of the belt assembly and a driving member at the other extremity, interengaging means on said belts and driving member for propelling the belts in successive rotation, means in said belts for attaching said advertising sheets comprising pins extending therethrough and means for maintaining a fixed spaced relation of said belts during their period of rotation comprising lateral offset portions in said housing for cooperation with said pins, and a driving gear on said driving member, a sprocket chain, sprocket pinion and worm gear assembly transmitting power from a power unit for propelling said mechanism.

In witness whereof I have hereunto set my hand this 20th day of February, A. D. 1930.

IRA D. WALTER.